A. H. CARLSON.
RESILIENT WHEEL.
APPLICATION FILED APR. 30, 1919.

1,344,986.

Patented June 29, 1920.
3 SHEETS—SHEET 1.

INVENTOR
ALBERT H. CARLSON.

A. H. CARLSON.
RESILIENT WHEEL.
APPLICATION FILED APR. 30, 1919.

1,344,986.

Patented June 29, 1920.
3 SHEETS—SHEET 2.

INVENTOR
ALBERT H. CARLSON.

BY
Strong & Townsend
ATTORNEYS

A. H. CARLSON.
RESILIENT WHEEL.
APPLICATION FILED APR. 30, 1919.

1,344,986.

Patented June 29, 1920.
3 SHEETS—SHEET 3.

INVENTOR
ALBERT H. CARLSON

UNITED STATES PATENT OFFICE.

ALBERT H. CARLSON, OF BUTTE CITY, CALIFORNIA.

RESILIENT WHEEL.

1,344,986.

Specification of Letters Patent.

Patented June 29, 1920.

Application filed April 30, 1919. Serial No. 293,617.

*To all whom it may concern:*

Be it known that I, ALBERT H. CARLSON, a citizen of the United States, residing at Butte City, in the county of Glenn and State of California, have invented new and useful Improvements in Resilient Wheels, of which the following is a specification.

This invention relates to vehicle wheels of the class particularly adapted for automobiles and the like and embodies a resilient structure between the hub and the felly.

One of the objects of the present invention is to provide a vehicle wheel adapted for automobiles and the like, which construction provides for resilient or elastic action within the wheel itself.

Another object of the invention is to provide a resilient structure, consisting of a series of spring and bumper spokes, so positioned as to be interposed between the hub and the felly and in conjunction therewith means for regulating the tension of the resilient members so as to adapt the wheel to varying conditions and requirements of load.

Another object of the invention is to provide a wheel which is simple and substantial in construction, adaptable for various uses, attractive and symmetrical in design, and above all, accessible to permit interchangeability and adjustment of parts.

Further objects will hereinafter appear.

The invention consists of the parts and the construction, combination and arrangement of parts as hereinafter more fully described and claimed, having reference to the accompanying drawings, in which—

Figure 1:
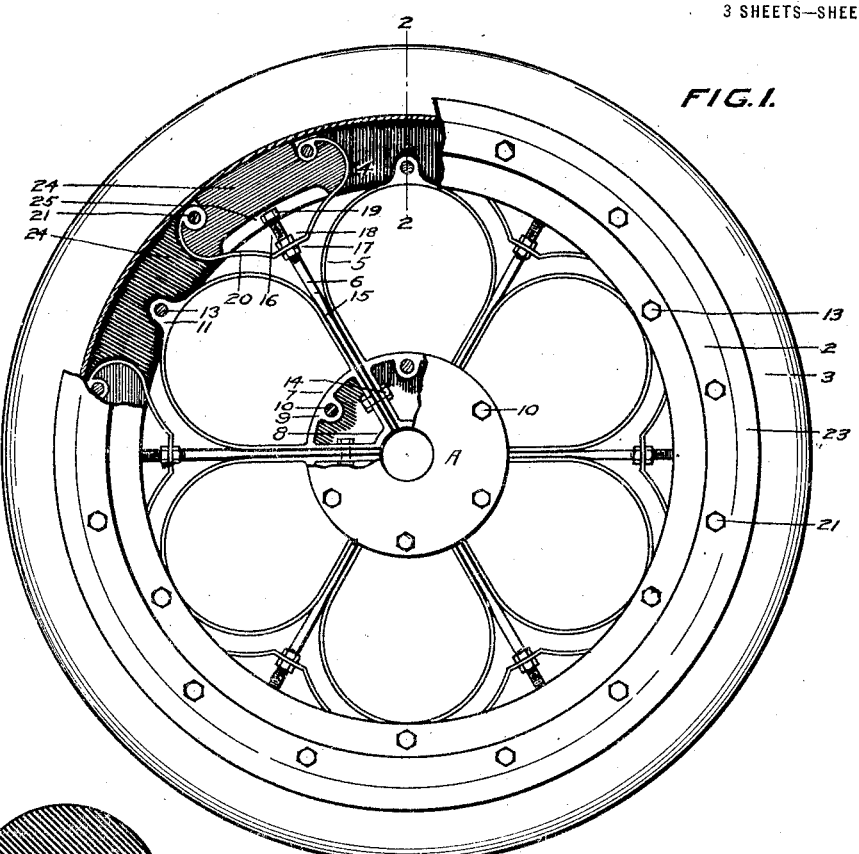
Figure 1 is a side elevation of the wheel with parts being broken away to show the construction of the same.

Referring to the drawings in detail, A indicates the hub of the wheel, 2, the felly, and 3, the tire.

Secured interior of the felly is a channel-shaped felly rim 4 and interposed between said felly rim and the hub are a series of approximately horseshoe shaped spring spokes 5 and a series of bumper spokes 6.

Figure 2:
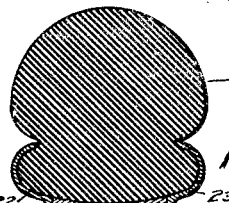
Fig. 2 is a cross section of the same.
Figure 3:
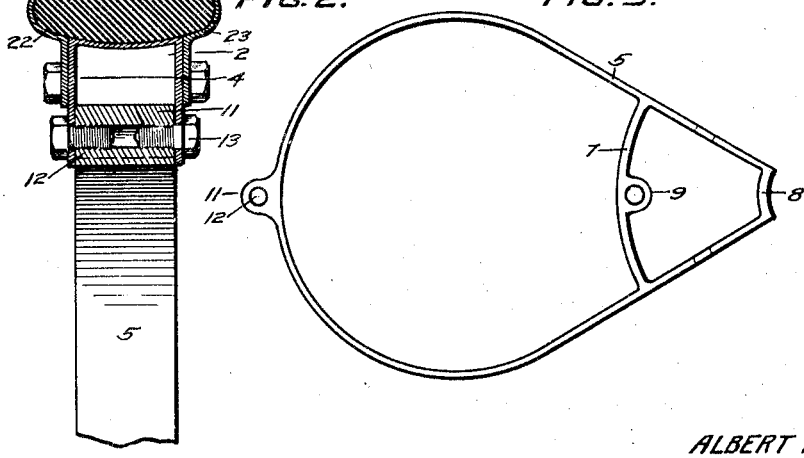
Fig. 3 is a detail view of one of the spring spokes.

The spring spokes are constructed substantially, as shown in Fig. 3; that is, the terminal ends of each spoke are united by a pair of transverse sections 7 and 8, which form a portion of the hub, the transverse section 7 being reinforced or enlarged, as shown at 9, to receive a flange bolt 10 hereinafter to be described. The outer curve of each spoke is centrally enlarged, as shown at 11, and is drilled and tapped as at 12, for the reception of securing bolts 13, which are introduced from opposite sides and pass through the felly rim 4, as shown in Fig. 2. The spring spokes are in this manner rigidly secured between the felly rim and the hub and they may therefore be extended or subjected to compression strains, due to the spring action of the steel or other material from which they are constructed.

The bumper spokes 6 are interposed between contiguous sides of the spring spoke, as shown in Fig. 1 and are secured by means of bolts 14 passing through the terminal ends of the respective spring spokes and as the terminal ends of the spring spokes are connected by the sections shown at 7 and 8, it can readily be seen that the hub is in reality formed by the terminal ends of the spring spokes and that said terminal ends form segments which, when assembled and secured by means of bolts 14, form a continuous circular hub member.

The bumper spokes are also constructed of spring steel or similar material; their inner ends are flattened, as shown at 15 to reduce the space occupied, to a minimum, and also to permit a certain amount of bending movement when the wheel is in action. The outer ends of the bumper spokes are round in cross section and are threaded, as shown at 16, for the reception of three nuts 17, 18 and 19.

Secured within the felly rim 4 in a manner similar to the spring spokes 5 are a plurality of bumper or tension springs 20. These springs are mounted in alinement with the bumper spokes and are connected therewith by means of the nuts 17 and 18. The shape of the tension springs are clearly shown in Fig. 1 and in reality are reversely curved terminating in S-shaped curvatures, whose ends are enlarged and provided with threaded bolt holes for the reception of bolts or screws 21. These bolts are inserted from opposite sides and serve the function of securing said springs within the felly rim and they also serve the function of securing a pair of clencher rims such as shown at 22 and 23. These rims are positioned one on each side of the felly proper and serve the usual function of securing the tire or tread member 3. The central portion of each tension spring is reinforced in thickness and is centrally perforated to permit the bumper spokes to pass therethrough, said spokes, when inserted, being secured by means of the nuts 17 and 18. Interposed between the side walls of the channel-shaped felly rim 4 and between each set of main and tension springs 20 is a resilient filler block 24, preferably constructed of rubber or like material. The inner face of each block is cut away, as shown at 25, to permit radial movement of the bumper spokes and also to serve as a stop member to limit the radial movement of the several bumper spokes; the nut 19, with which each bumper spoke is provided, serves as a bumper or stop member when engaging the resilient filler.

The function of the tension springs is implied by their name as they, in conjunction with the bumper spokes, provide means whereby the flexible tension of the wheel may be regulated to be adapted to varying conditions and requirements of load and to equalize any change of tension that may result from use within the wheel itself in relation to the displacement of the hub center circumferentially in the wheel. The tension of the springs 20 is regulated by means of the nuts 17 and 18 and it is therefore possible, by increasing or decreasing the tension of the springs 20, to regulate the resilient movement of the spring spokes 5. This feature is of great value as it will permit a central positioning of the hub within the wheel at all times.

In actual operation, it can readily be seen that the resiliency of the wheel may be easily regulated by means of the nuts 17 and 18 and the tension springs 20. It should also be obvious that the spring spokes may be subjected, both to tension and compression and furthermore, that a limited circumferential movement of the rim with relation to the hub will be permitted, due to the flexible construction of the spring spokes and the bumper spokes. Yielding movement in every direction required is therefore obtained and excess compression or extension of any spoke, is at all times limited, due to the provision of the bumper spokes, the tension springs 20 and the filler or bumper blocks 24. Excess straining of any individual spoke or number of spokes is thus prevented and unnecessary crystallization positively prevented.

Figure 4:
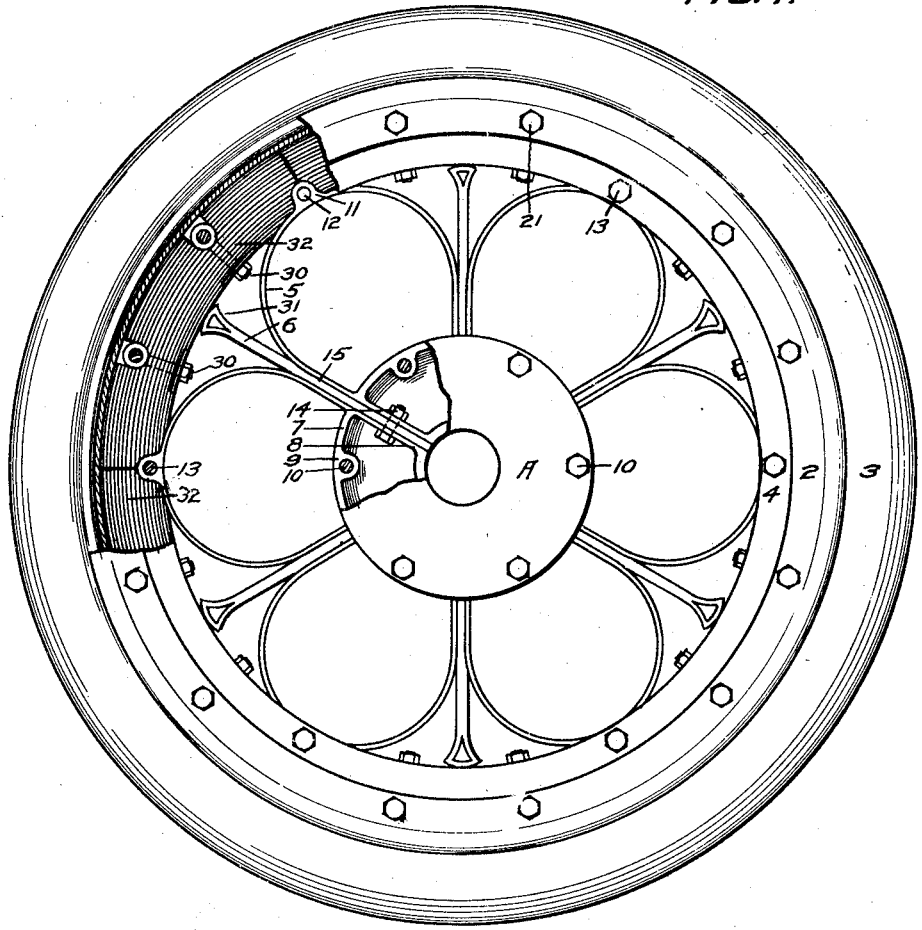
Fig. 4 shows a modified form of the wheel.

A modified form of wheel shown in Fig. 4 is similar in construction to the wheel shown in Fig. 1; that is, construction of the spring spokes, the inner felly rim, clencher rim and the tire carried thereby is identical. The main difference in construction consists in the positioning of the resilient filler blocks, which in this instance are secured within the rim 4 by means of bolts 30. It also consists in the construction of the bumper spokes, which in this instance are not attached to the felly. The outer ends of the bumper spokes are provided with flattened head members 31 which will normally remain out of contact with the filler blocks 32. Excess movement, that is, compression or extension of the spring spokes will permit the heads 31 of the bumper spokes to engage the filler blocks and thereby limit the movement of the spring spokes. They will also serve the function of partly supporting the load when the wheel is subjected to excess strains, as engagement of the head members 31 with the filler blocks places said blocks under compression, thereby taking up a portion of the load.

Figure 5:
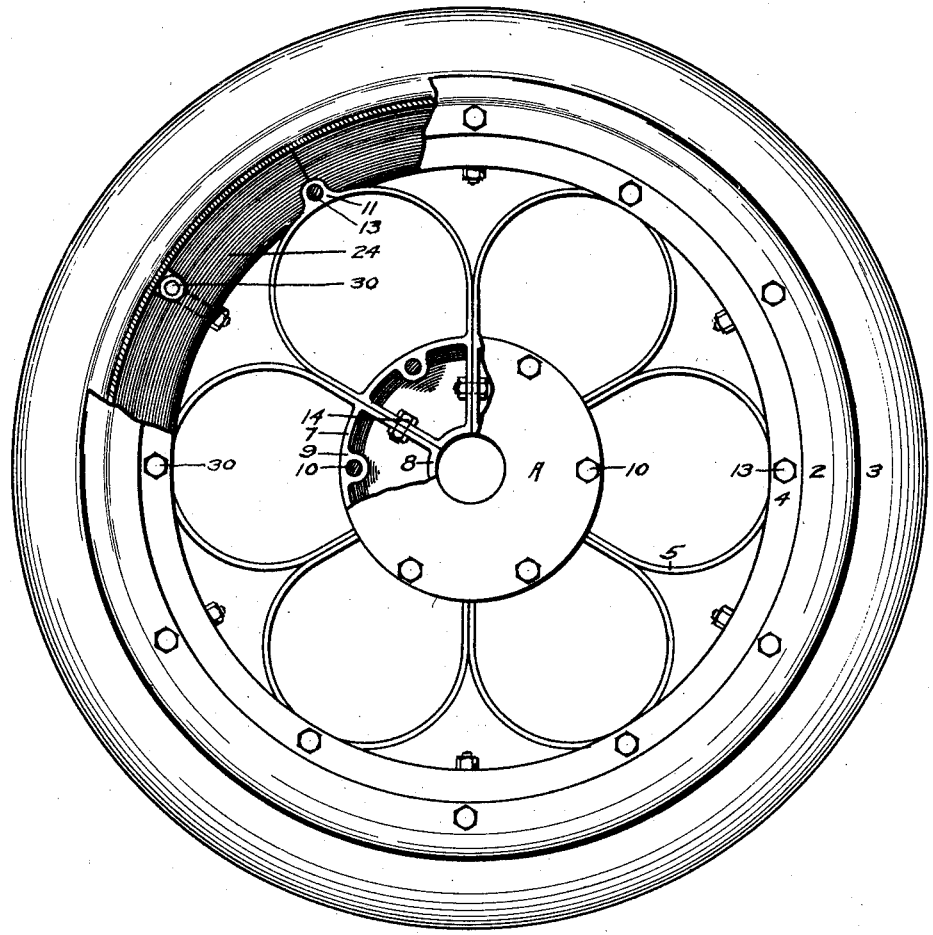
Fig. 5 shows another modified form of the wheel.

The modified form of wheel shown in Fig. 5 is also similar to the construction shown in Figs. 1 and 4, the only difference being that the bumper spokes and the tension springs are entirely eliminated, the resiliency of the wheel being dependent entirely upon the action of the spring spokes. This type of wheel will, without a doubt, be useful, particularly where light loads are handled, while the types of wheels shown in Figs. 1 and 4 will probably be required where heavier loads or vehicles are employed.

By referring to the several types of wheel shown, it can be seen that the clencher rim employed is similar in each instance. These double rims are so designed that the tire is clamped and held in place on the wheel in the manner of a vise. This arrangement is of considerable importance from a practical point of view as it obviates the necessity of vulcanizing the tire to the rim. It therefore serves as a simple tire mounting and is really of the demountable type as the tire may be removed from the felly whenever desired. It furthermore provides for the use of solid tires or pneumatic tires or permits interchanging of the same whenever required.

The wheel proper is otherwise simple and substantial in construction and it should be apparent that the adjustment provided renders the wheel adaptable for various uses. The design of the wheel is furthermore symmetrical and attractive and all parts are accessible, thus permitting ready interchangeability or adjustment of parts.

While certain parts of the wheel and the fastening means employed are more or less specific in design and construction, I wish it understood that such features may be varied to suit varying conditions and applications; similarly, that the materials and finish of the several parts employed may be such as the experience and judgment of the manufacturer may dictate.

Having thus described my invention, what I claim and desire to secure by Letters Patent is—

1. A resilient wheel comprising a felly, a hub member, a plurality of spring spokes interposed between the hub and the felly, said spring spokes having their terminal ends separated but rigidly connected by a pair of transverse sections, said transverse sections and terminal ends of the spokes forming hub segments, means passing through said hub segments and securing the same, a centrally positioned enlargement formed on the opposite end of each spoke, and fastening means extending through the felly and said enlarged portions to secure the spokes to the felly.

2. A resilient wheel comprising a felly, a hub member, a plurality of horseshoe shaped spring spokes interposed between the hub and the felly, said spring spokes having their terminal ends separated but rigidly connected by a pair of transverse sections, said transverse sections and terminal ends of the spokes forming hub segments, means passing through said hub segments and securing the same, a channel-shaped rib member secured within the felly, a centrally positioned enlargement formed on the opposite end of each spoke, said enlargement being perforated and threaded, and fastening bolts passing through the vertical walls of the channel-shaped rim from opposite sides thereof, adapted to secure the spokes to the felly rim, and radial spokes extending from the hub between contiguous sides of the spring spokes with the outer ends of said radial spokes contacting with the felly filler.

3. A resilient wheel comprising a felly, a hub member, spring spokes interposed between the hub and the felly, and radial spokes interposed between the spring spokes, said radial spokes being secured at their inner ends between the spring spokes, a transverse spring connection between the felly and the outer end of each bumper spoke, and means for increasing or decreasing the tension of the spring members forming the connection between each bumper spoke and the felly.

4. A resilient wheel comprising a felly, a hub member, spring spokes interposed between the hub member and the felly, tension springs secured to the felly, bumper spokes interposed between the spring spokes, said bumper spokes being secured at their inner ends to the hub member and at their outer ends to the tension springs.

5. A resilient wheel comprising a felly, a hub member, spring spokes interposed between the hub member and the felly, tension springs secured to the felly, bumper spokes interposed between the spring spokes, said bumper spokes being secured at their inner ends to the hub member and at their outer ends to the tension springs, and means on each bumper spoke for increasing or decreasing the tension of the tension springs.

6. A resilient wheel comprising a felly, a hub member, spring spokes interposed between the hub member and the felly, tension springs secured to the felly, bumper spokes interposed between the spring spokes, said bumper spokes being secured at their inner ends to the hub member and at their outer ends to the tension springs, and means on each bumper spoke for increasing or decreasing the tension of the tension springs, a bumper head formed on the outer end of each bumper spoke, a resilient member interposed between said bumper head and the felly.

7. A resilient wheel comprising a felly, a hub member, a plurality of spring spokes interposed between the hub and the felly, said spring spokes having their terminal ends secured in the felly, a channel-shaped rim secured within the felly, an enlarged perforated centrally positioned member formed on the outer end of each spoke projecting between the walls of the channel-shaped rim section, bolts passing through the walls of the rim section securing the outer ends of the spring spokes thereto, arc-shaped tension springs secured within the channel-shaped rim member and between the outer ends of each set of spring spokes, bumper spokes interposed between the spring spokes, said bumper spokes being flattened at their inner ends and secured between the spring spokes, and means securing the outer ends of the bumper spokes to the tension springs.

8. A resilient wheel comprising a felly, a hub member, a plurality of spring spokes interposed between the hub and the felly, said spring spokes having their terminal ends secured in the felly, a channel-shaped rim secured within the felly, an enlarged perforated centrally poistioned member formed on the outer end of each spoke projecting between the walls of the channel-shaped rim section, bolts passing through the walls of the rim section securing the outer ends of the spring spokes thereto, reversely curved tension springs secured within the channel-shaped rim member and between the outer ends of each set of springs, bumper spokes interposed between the spring spokes, said bumper spokes being flattened at their inner ends and secured between the spring spokes, and an adjustable connection between each bumper spoke and tension spring.

9. A resilient wheel comprising a felly, a hub member, a plurality of spring spokes interposed between the hub and the felly, said spring spokes having their terminal ends secured in the hub, a channel-shaped rim secured within the felly, an enlarged perforated centrally positioned member formed on the outer end of each spring spoke projecting between the walls of the channel-shaped rim section, bolts passing through the walls of the rim section securing the outer curves of the spring spokes thereto, arc-shaped tension springs secured within the channel-shaped rim member and between the outer ends of each set of spring spokes, bumper spokes interposed between the spring spokes, said bumper spokes being flattened at their inner ends and secured between the spring spokes, a threaded portion formed on the outer end of each bumper spoke, a perforation formed centrally on each tension spring through which the bumper spoke extends, nuts on the bumper spoke engageable with the opposite sides of the tension spring to form a rigid connection between the tension springs and the bumper spokes.

10. A resilient wheel comprising a felly, a hub member, a plurality of spring spokes interposed between the hub and the felly, said spring spokes having their terminal ends secured in the hub, a channel-shaped rim secured within the felly, an enlarged perforated centrally positioned member formed on the outer end of each spoke projecting between the walls of the channel-shaped rim section, bolts passing through the walls of the rim section securing the outer ends of the spring spokes thereto, reversely curved tension springs secured within the channel-shaped rim member and between the outer ends of each set of spring spokes, bumper spokes interposed between the spring spokes, said bumper spokes being flattened at their inner ends and secured between the spring spokes, a threaded portion formed on the outer end of each bumper spoke, a perforation formed centrally on each tension spring through which the bumper spoke extends, nuts on the bumper spoke engageable with the opposite sides of the tension spring to form a rigid connection between the tension springs and the bumper spokes, a bumper nut on the outer end of each bumper spoke, and a resilient member within the channel-shaped rim section with which the bumper nut is engageable during the resilient movement of the tension springs and the spring spokes.

11. A resilient wheel comprising a felly, a hub member, a plurality of spring spokes interposed between the hub and the felly, said spring spokes having their terminal ends secured in the felly, a channel-shaped rim secured within the felly, an enlarged perforated centrally positioned member formed on the outer end of each spring spoke projecting between the walls of the channel-shaped rim section, bolts passing through the walls of the rim section securing the outer ends of the spring spokes thereto, arc-shaped tension springs secured within the channel-shaped rim member and between the outer ends of each set of spring spokes, bumper spokes interposed between the spring spokes, said bumper spokes being flattened at their inner ends and secured between the spring spokes, a threaded portion formed on the outer end of each bumper spoke, a perforation formed centrally on each tension spring through which the bumper spoke extends, nuts on the bumper spoke engageable with the opposite sides of the tension spring to form a rigid connection between the tension springs and the bumper spokes, a bumper nut on the outer end of each bumper spoke, and a resilient filler block interposed between each tension spring and secured within the channel-shaped rim member with which the bumper heads are engageable.

In testimony whereof I have hereunto set my hand in the presence of two subscribing witnesses.

ALBERT H. CARLSON.

Witnesses:
EMMA TUFTE,
GEORGE O. SAGEN.